April 19, 1927.
H. FRAUENTHAL
DIMENSION GAUGE
Filed Sept. 24, 1926
1,625,462
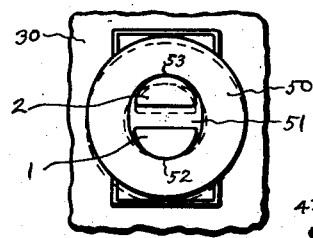
FIG. 5
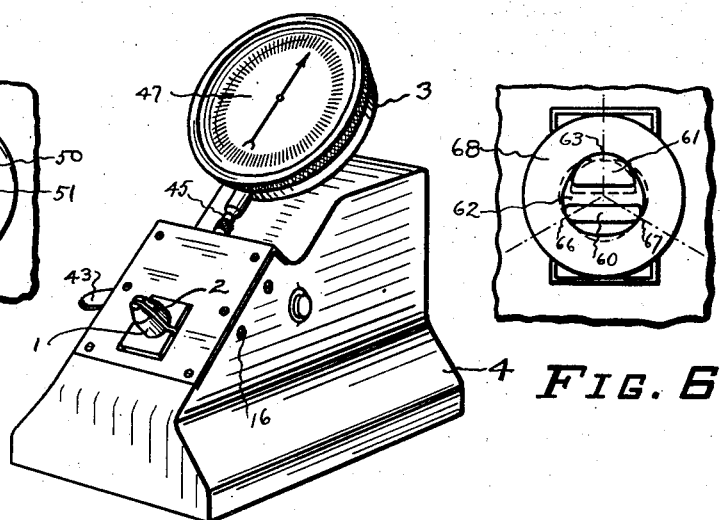
FIG. 6
FIG. 1
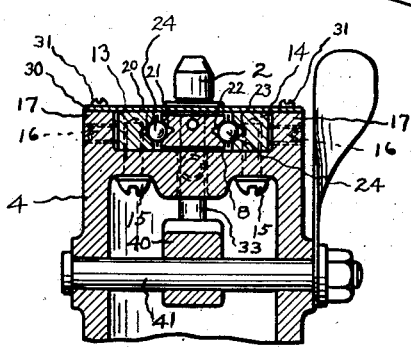
FIG. 4
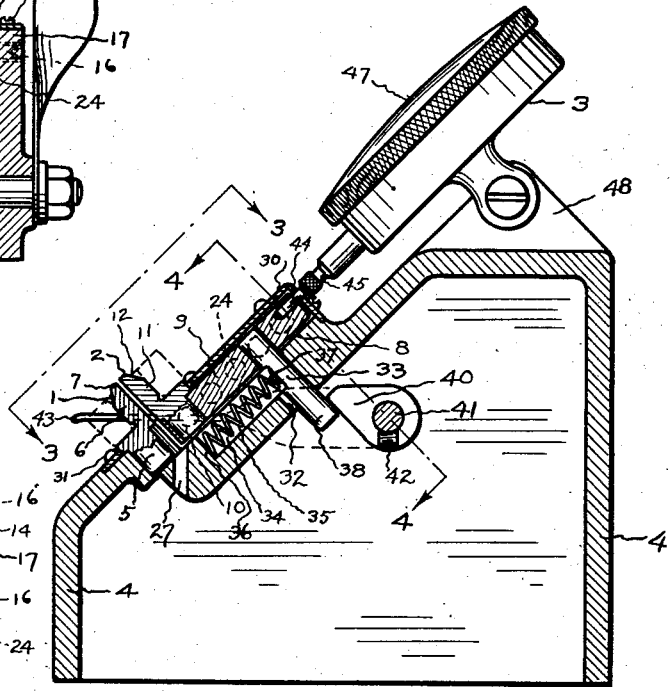
FIG. 3
FIG. 2
INVENTOR
Harold Frauenthal
BY
Evans and McCoy
ATTORNEYS Patented Apr. 19, 1927.

1,625,462

UNITED STATES PATENT OFFICE.

HAROLD FRAUENTHAL, OF CLEVELAND, OHIO.

DIMENSION GAUGE.

Application filed September 24, 1926. Serial No. 137,491.

This invention relates to gauges, and more particularly to gauges for testing and measuring apertures.

Frequently in the past, plug gauges have been employed to determine the accuracy of apertures such as in metal parts. Such plug gauges, however, determine only maximum and minimum dimensions and tell nothing about the exact shape of an aperture. Thus, out-of-roundness cannot be detected by the use of plug gauges.

An object of this invention is to provide a gauge whereby dimensions of parts may be readily and accurately determined.

A further object of my invention is to provide a gauge for testing apertured parts whereby the exact shape and dimensions of said apertures may be quickly and accurately determined.

Another object of this invention is to provide an indicating gauge with which out-of-roundness in apertured parts may be readily detected, and the amount of such out-of-roundness measured.

In the drawings:

Figure 1 is a perspective view of a form of gauge contemplated by my invention;

Fig. 2 is a vertical section taken centrally through the gauge shown in Fig. 1;

Fig. 3 is a plan view on line 3—3 of Fig. 2 with the dust cover removed;

Fig. 4 is a sectional view taken on line 4—4 of Fig. 2;

Fig. 5 is an enlarged plan view of the gauge members, with a piece to be tested disposed in cooperative relation therewith; and Fig. 6 is an enlarged plan view similar to Fig. 5 showing gauge members of a modified form.

My invention may be said to contemplate a gauge having a fixed, and a movable gauge member, said gauge members being normally spaced apart by resilient means, and being adapted to cooperate with the wall of an aperture to be measured. The gauge is preferably arranged so that the size of the aperture, as determined by the movement or position of the movable gauge member, is directly indicated by a suitable indicating means.

Thus there is shown in Fig. 1 a gauge having a fixed gauge member 1, and a second movable gauge member 2, normally spaced from the first gauge member 1 by suitable resilient means. The movement or position of the movable gauge member 2, and hence the size of an aperture to be measured is indicated on the dial of the indicator 3.

The gauge is provided with the base support 4 which is preferably heavy and which is shown in the form of a hollow casting. Supported in fixed position on the support 4 is the fixed gauge member 1. The member 1 is shown as provided with extended portion 5 snugly disposed in a correspondingly shaped aperture in the base support 4. The upper portion 6 of the member 1, is shown as semi-cylindrical in shape for a purpose to be later more fully described, and as provided with a tapered top portion 7. A modified form of fixed gauge member is shown in Fig. 6 which will also be later described.

The upper portion of the base support 4 is shown as provided with a slideway 8. Disposed in said slideway and movable longitudinally thereof toward and from said fixed gauge member 1 is a slide 9. Carried by the slide 9 is the second gauge member 2, having an extended portion 10, and a semi-cylindrical portion 11, and a top portion 12. When the gauge members 1 and 2 are disposed adjacent to each other, the semi-cylindrical portions 6 and 11 thereof form a cylindrical portion.

Disposed on each side of the slide 9 and parallel to the line of travel thereof are the transversely adjustable guide blocks 13 and 14. The guide blocks 13 and 14 may be secured to the base support 4, by suitable means such as the screws 15. Lateral adjustment of the guide blocks 13 and 14 to prevent transverse movement of the slide 9 may be obtained by means of the adjusting screws 16, extending through the upstanding sides 17 of the slideway.

In the adjacent cooperating portions of the guide blocks 13 and 14, and slide 9, are the grooves 20, 21, 22 and 23, arranged to form a ball race to receive the frictionless bearings 24. The bearings 24 support the slide 9 in spaced relation to the bottom of the slideway 8, so that the slide 9 may move longitudinally without substantial friction, whereby gauge readings may not be rendered inaccurate due to friction in moving parts. Retainers 25 and 26 are shown disposed between the grooves 20 and 21, and 22 and 23 respectively, to maintain the bearings 24 in suitable spaced alignment. Adjacent the lower portion of the slideway 8, is the clean-out aperture 27, and over the slide 9 and guide blocks 13 and 14, may be disposed a suitable dust-proof cover 30 affixed to the base support 4 by any suitable fastening means such as the screws 31.

Snugly disposed in a suitable aperture in the slide 9, movable with said slide, and extending inwardly of the hollow base support 4 through the aperture 32, is a pin 33. In the recess 34 disposed below the slideway 8, is shown a resilient spring 35 adapted to be normally under compression to exert pressure against the wall 36 of the recess 34, and the suitably flattened portion 37 of the pin 38. By means of the spring 35 and the pin 38, the second gauge member 2 is normally yieldingly maintained in spaced relation to the fixed gauge member 1. Since the possible longitudinal movement of the slide 9 is preferably relatively small, substantially constant pressure is exerted by the spring 35 upon the pin 38 and upon pieces to be measured whereby uniform, consistent and accurate results are readily obtained.

The gauge member 2 may be moved toward the fixed gauge member 1 by means of the cam member 40. Journaled transversely of the base support 4 is the rotatable shaft 41. The cam member 40 is mounted on the shaft 41, and locked against rotation therewith as by the set screw 42. On one end of the shaft 41 is mounted the handle 43 by depressing which the shaft may be rotated. Referring particularly to Fig. 2, it will be understood that when the handle 43 is depressed, the cam member 40 will cooperate with the pin 38 to move the slide 9 and the second gauge member 2 toward the fixed gauge member 1.

Extending longitudinally from the upper end of the slide 9 is a pin 44 arranged to cooperate with the stem 45 of the indicator 3. The stem 45 preferably normally exerts a slight pressure on the pin 44, whereby movement of the gauge member 2 and slide 9 is indicated directly on the dial 47. If desired, the pin 44 may be omitted and the stem 45 arranged to contact with the upper end of the slide 9.

The indicating means 3 is shown as pivotally affixed to the boss 18 of the support 4, in order that for purposes of disassembly of the gauge, the indicator 3 may be swung out of engagement with the pin 45, carried by the slide 9.

To make internal measurements with my improved gauge, the handle 43 is depressed, moving the second gauge member 2 toward the fixed member 1. The piece 50 having an aperture 51 whose size and shape is to be determined is then disposed over the gauge members to the position shown in dotted lines in Fig. 2. The handle 43 is then released. It will be noted that the diameter of the semi-cylindrical gauge portions shown in the drawings is preferably smaller than that of the aperture to be measured. By this means substantially line contact may be obtained between the points of tangency of the gauge members 1 and 2 and the wall of the aperture 51, as indicated at 52 and 53 in Fig. 5. It will be understood, of course, that the gauge members 1 and 2 may also be made of such shape to give point contact with the wall of an aperture to be measured, as will be readily understood to those skilled in the art.

When the handle 43 is released, it will be noted that the gauge member 2, due to the force exerted by the spring 35, tends to move away from the fixed gauge member 1, whereby the gauge members 1 and 2 exert a certain constant pressure upon the wall of the aperture 51 at the points of contact therewith. The diameter of the aperture 51 with the piece in the position shown in Fig. 2 will be shown on the dial 47. It will be understood that the dial may be previously calibrated with a suitable standard test piece to give a desired dial reading for a particular diameter. The piece 50 may be rotated about the gauge members 1 and 2, which, due to the force exerted by the spring 35, will remain in contact with the wall of an aperture, whereby the diameters of the aperture 51 will be continuously measured and continuously indicated on the dial 47. Thus it will be seen that the aperture may be readily and rapidly measured for size and out-of-roundness.

The aperture 51 in the piece 50 is shown as being elliptically out-of-round, the position of the aperture and of the movable gauge member 2 when the piece 50 has been rotated a definite amount being shown in dotted lines in Fig. 5.

It will be noted that the pressure exerted upon the walls of apertures to be measured is substantially uniform and constant, whereby the readings obtained by the gauge are very accurate, and whereby the readings obtained from day to day, for example, in production inspection work are comparative.

Where the out-of-roundness of apertures is likely to be triangular, or polygonal in a multiple of three, such as due to the method of forming the apertures, modified gauge members 60 and 61 shown in Fig. 6, may be employed. The movable gauge member 61 is substantially similar to the movable gauge member 2 previously described, line contact with the wall of the aperture 62 taking place at the line of tangency 63. The fixed gauge member 60 is shown as provided with two cylindrical portions whereby line contact with the wall of the aperture 62 may take place at 66 and 67. The points of tangency 63, 66 and 67 are preferably 120° apart. The aperture 62 of the piece 68 is shown as being out-of-round in a triangular manner, the position of the aperture and of the movable gauge member 61 when the piece 68 has been rotated a definite amount being shown in dotted lines in Fig. 6.

It will be understood that my improved gauge may be employed for measuring any internal surfaces, and is not confined for use in measuring substantially circular apertures.

It will thus be seen that I have provided a new and relatively simple and sturdy gauge, having substantially frictionless moving parts, for rapidly and accurately measuring internal dimensions.

It will further be noted that I have provided a gauge giving uniform results whereby measurements may be made which are not only relative for one particular piece to be measured, but comparative for readings taken from day to day.

It will also be seen that my gauge is adapted for rapid production inspection of precision parts such as employed in the automotive industry.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a gauge particularly adapted for the accurate measurement of internal dimensions, in combination, a base support, a fixed gauge member carried by said support, a slide movable on said support toward and away from said fixed gauge member, a second gauge member carried by said slide, means exerting substantially uniform pressure and arranged to maintain said second gauge member in spaced relation to said fixed gauge member, said slide being adapted to be moved toward said fixed gauge member whereby the piece whose internal dimension is to be measured may be readily disposed externally of said gauge members, said slide being positioned in measuring position by said pressure exerted on said second gauge member, whereby said gauge members will contact with internal portions of the piece to be measured, and indicating means associated with and actuated by said slide, whereby said internal dimension will be directly and accurately indicated on said indicating means.

2. In a gauge particularly adapted for the accurate measurement of internal dimensions, in combination, a base support, a fixed gauge member carried by said support, a slide movable on said support toward and away from said fixed gauge member frictionless bearings associated with said support, said slide being mounted in said frictionless bearings whereby the accurate measurement of an internal dimension will not be inhibited by friction between said slide and adjacent parts, and whereby the accuracy of the instrument may be retained, a second gauge member carried by said slide, means exerting substantially uniform pressure and arranged to maintain said second gauge member in spaced relation to said fixed gauge member, said slide being adapted to be moved toward said fixed gauge member whereby the piece whose internal dimension is to be measured may be readily disposed externally of said gauge members, said slide being positioned in measuring position by said pressure exerted on said second gauge member, whereby said gauge members will contact with internal portions of the piece to be measured, and indicating means associated with and actuated by said slide, whereby said internal dimension will be directly and accurately indicated on said indicating means.

3. In a gauge particularly adapted for the accurate measurement of internal dimensions, in combination, a base support, a fixed gauge member carried by said support, a slide movable on said support toward and away from said fixed gauge member, frictionless bearings associated with said support, said slide being mounted in said frictionless bearings whereby the accurate measurement of an internal dimension will not be inhibited by friction between said slide and adjacent parts, and whereby the accuracy of the instrument may be retained, adjustable guide members arranged to prevent transverse movement of said slide, a second gauge member carried by said slide, means exerting substantially uniform pressure and arranged to maintain said second gauge member in spaced relation to said fixed gauge member, said slide being adapted to be moved toward said fixed gauge member whereby the piece whose internal dimension is to be measured may be readily disposed externally of said gauge members, said slide being positioned in measuring position by said pressure exerted on said second gauge member, whereby said gauge members will contact with internal portions of the piece to be measured, and indicating means associated with and actuated by said slide, whereby said internal dimension will be directly and accurately indicated on said indicating means.

4. In a gauge, in combination, a base support, a fixed gauge member carried by said support, there being a slideway on said support, frictionless bearings associated with said support, a slide mounted in said frictionless bearings and movable in said slideway toward and away from said fixed gauge member, a second gauge member carried by said slide, a projecting portion carried by said slide and movable therewith, resilient means arranged to cooperate with said projecting portion to yieldingly maintain said second gauge member in spaced relation to said fixed gauge member, a cam member arranged to cooperate with said projecting portion to move said second gauge member toward said fixed gauge member, means for actuating said cam member, and indicating means cooperatively associated with said slide and actuated directly by movement thereof.

5. In a gauge, in combination, a base support, a fixed gauge member carried by said support, there being a slideway on said support, frictionless bearings associated with said support, a slide mounted in said frictionless bearings and movable in said slideway toward and away from said fixed gauge member, adjustable guide members arranged to prevent transverse movement of said slide, a second gauge member carried by said slide and adapted to be disposed adjacent said fixed gauge member, a projecting portion carried by said slide and movable therewith, resilient means arranged to cooperate with said projecting portion to yieldingly maintain said second gauge member in spaced relation to said fixed gauge member, a cam member arranged to cooperate with said projecting portion to move said second gauge member toward said fixed gauge member, means for actuating said cam member, and indicating means actuated directly by movement of said slide.

6. In a gauge, in combination, a base support, a fixed gauge member carried by said support and provided with a semi-cylindrical portion, there being a slideway on said support, a slide movable in said slideway toward and away from said fixed gauge member, transversely adjustable guide blocks secured to said base support and disposed on each side of said slide parallel to the line of travel thereof, there being grooves in the adjacent cooperating portions of said guide blocks and slide, frictionless bearings disposed in said grooves intermediate said guide blocks and slide, and supporting said slide in spaced relation to the bottom of said slideway, a second gauge member carried by said slide and provided with a semi-cylindrical portion adapted to cooperate with the corresponding portion of the fixed gauge member to form a cylindrical portion, a pin carried by said slide and movable therewith, a spring arranged to cooperate with said pin to yieldingly maintain said second gauge member in spaced relation to said fixed gauge member, a transverse shaft journaled in said base support, a cam mounted on said shaft and arranged to cooperate with said pin to move said second gauge member toward said fixed gauge member, a handle arranged to actuate said cam shaft and cam, and an indicator cooperatively associated with said slide and actuated by movement thereof.

In testimony whereof I affix my signature.

HAROLD FRAUENTHAL.